Patented Oct. 19, 1954

2,692,249

UNITED STATES PATENT OFFICE 2,692,249

AROMATIC POLYESTERS AND THE PROCESS OF PRODUCING THE SAME

James Lincoln, London, England, assignor to British Celanese Limited, a corporation of Great Britain No Drawing. Application July 1, 1952, Serial No. 296,750

Claims priority, application Great Britain July 25, 1951

15 Claims. (Cl. 260—42)

This invention relates to the production of organic polymers and is more particularly concerned with the production of high-melting polyesters.

It is well known to produce polyesters by condensation of a dicarboxylic acid with a glycol or by self-condensation of a hydroxy-carboxylic acid. In general the products are low melting and hence even if of sufficiently high molecular weight to produce fibres are of no value for textile fibre production. However, it is well known that by selecting certain aromatic components for the production of these polyesters a few polyesters of melting point above 200° C. can be produced. For example, when terephthalic acid is condensed with ethylene glycol the product melts at 255° C. However, the range of glycols suitable for condensation with terephthalic acid to produce high-melting polymers is very restricted, and already with tetramethylene glycol the melting point of the product is down to 218° C. Much the same applies to more complex aromatic dicarboxylic acids such as 4.4'-dicarboxy-diphenyl, 4.4'-dicarboxy-diphenyl-methane (in this case the product with ethylene glycol is substantially the only one which melts above 200° C.), 4.4'-dicarboxy-diphenyl-ethane and similar $\alpha,\omega$-bis-(4-carboxyphenyl)-alkanes. The same applies also to the $\alpha,\omega$-bis-(4-carboxyphenoxy)-alkanes. Again it is known that either 4-hydroxy-methyl-benzoic acid or 4-($\beta$-hydroxyethoxy)-benzoic acid can be condensed with itself to produce a polymer having a melting point slightly above 200° C. Here again, however, the field is very restricted and closely analogous compounds such as 4-($\beta$-hydroxyethyl)-benzoic acid when condensed with itself produces a polymer having a melting point below 200° C. The same applies to 4-($\beta$-hydroxyethoxy)-phenyl-acetic acid.

I have now found that the introduction of a chlorine atom in the 3-position of 4-($\beta$-hydroxyethoxy)-benzoic acid considerably increases the melting point of the polymer produced from the hydroxy-carboxylic acid. Thus whereas poly-4-($\beta$-hydroxyethoxy)-benzoic acid melts at 200-210° C. the polymer from 4-($\beta$-hydroxyethoxy)-3-chlor-benzoic acid melts at 280-285° C. This intermediate 4-($\beta$-hydroxyethoxy)-3-chlor-benzoic acid and its esters, for example its methyl, ethyl and phenol esters and its formyl and acetyl esters, as well as its polymers and copolymers, are new compounds and form part of the present invention.

The melting point of 280-285° C. is rather high for some purposes, particularly for ease of melt spinning, and accordingly it is within the invention to form a mixture of the polymer with another polymer, particularly another polyester, or to form a co-polymer of 4-($\beta$-hydroxyethoxy)-3-chlor-benzoic acid with other polyester-forming reagents. Such other polyester-forming reagents may be of the simple aliphatic type, such as hydroxy-polymethylene carboxylic acids or polymethylene dicarboxylic acids with polymethylene glycols, but are preferably of the aromatic type capable, when condensed alone, of yielding homopolyesters of high melting point of the order of 200° or more, as set out above; for instance terephthalic acid with ethylene glycol, 4.4'-dicarboxy-diphenyl with ethylene glycol or the unsubstituted 4-($\beta$-hydroxyethoxy)-benzoic acid. Such mixtures or copolymers may be produced in any convenient way. For example the already formed polymer from 4-($\beta$-hydroxyethoxy)-3-chlor-benzoic acid may be mixed with an already formed polymer, for example from terephthalic acid and ethylene glycol or from 4-($\beta$-hydroxyethoxy)-benzoic acid, and the two polymers quickly melted together to form a mixture, or alternatively the melting may be continued until a substantially homogeneous copolymer is obtained, or the monomeric compounds may be mixed together initially and the whole condensed to form the co-polymer.

Preferably the amount of such admixed reagents is such that the melting point of the copolymer is not less than 230° C. and most advantageously is in the range of 240-270° C.

The new monomer 4-($\beta$-hydroxyethoxy)-3-chlor-benzoic acid may be produced by reaction of ethylene chlorhydrin upon 4-hydroxy-3-chlor-benzoic acid while the esters may be produced by esterification of the free acid, for example with methyl or ethyl alcohol, or by acidylation, e. g. with formic acid, acetic anhydride or acetyl chloride or other acid anhydride or halide, of the free alcoholic groups. The invention also includes the mixed esters in which both the alcohol group and the carboxylic group are esterified, as for example in methyl-4-($\beta$-formyloxyethoxy)-3-chlor-benzoate. Such mixed esters may likewise be used for the production of the polymers.

The polyester-forming reaction may be carried out by the standard methods, for example carboxy and hydroxy groups may be present in the reaction mixture in the free state, in which case an esterification catalyst is preferably present, for example para-toluene sulphonic acid, phosphoric acid, sulphamic acid, and the like, or alternatively the carboxy and hydroxy groups may be present in the form of ester-forming derivatives. For example, and this is the preferable form, the carboxy group may be present as an ester of a volatile monohydroxy compound, for example methyl alcohol, ethyl alcohol, phenol and the like. In such a process of ester-interchange it is again preferable to have a catalyst present, for example magnesium, sodium or sodium and magnesium or lithium. Again the hydroxy groups may be present in the form of simple esters of acids which are readily volatile under the polyesterification conditions. Thus the hydroxy groups may be present in the form of formates or acetates.

Where in a reaction between a dicarboxylic acid and a glycol the glycol is volatile under the reaction conditions, it is preferably used in a large excess and the excess allowed to evaporate. Generally the esterification is carried out at relatively high temperatures in the melt or in solution in an inert solvent. The temperatures of the order of 200–250° may be used, especially in the early stages, and in the later stages still higher temperatures, for example 250–300° C. In these later stages it is desirable to carry out the reaction under low pressure, for example a pressure of the order of 2 mms. of mercury or less, in order to remove the volatile by-product, which may be a volatile mono-hydroxy compound such as methanol, ethanol or phenol, or a volatile glycol such as ethylene glycol. The esterification is preferably continued until a product having fibre-forming properties is produced. For this purpose the reagents, if substantially non-volatile under the reaction conditions, should be employed in such proportions that there are substantially equal numbers of hydroxy and carboxy groups or their equivalents in the reaction mixture. Where one of the reagents is volatile and is allowed to evaporate during the reaction, that reagent should be employed in excess.

The following examples illustrate the production of the intermediate and of the polymers according to the invention, all parts being by weight. The reaction temperatures in the various polymerisations are oil bath temperatures.

*Example 1.—Preparation of the 3-chloro acid*

28.7 parts of 4-hydroxy-3-chlor-benzoic acid were dissolved in a solution of 14.7 parts of caustic soda in 100 parts water. 13.7 parts of ethylene chlorhydrin were gradually added with shaking to the hot solution which was then heated for ½ hour under reflux to complete the reaction. The mixture was then acidified with concentrated hydrochloric acid and the white solid which was deposited was collected. The crude product had a melting point of 154–159° C. It was recrystallised from a mixture of benzene with a small quantity of ethanol to give a product of melting point 166–169° C.

*Example 2.—Preparation of the ethyl ester of the acid*

26 parts of the acid made according to Example 1 were refluxed with 300 parts of dry ethanol and 9.2 parts of concentrated sulphuric acid for 7½ hours. The solution was neutralised with sodium bicarbonate and filtered. Most of the ethanol was then distilled off from a water-bath and the residue poured into water. An oil at first appeared which subsequently solidified. At this stage it had a melting point of 67–73° C. It was recrystallised from a mixture of petrol ether and benzene (5 vols. petrol ether, 2 vols. benzene) to give an ester having a melting point of 75° C.

*Example 3.—Preparation of the homo-polymer*

The ester produced according to Example 2 was mixed with a small quantity of magnesium ribbon and of sodium methylate dissolved in methanol and the mixture gradually heated up to 200° C. After 15 minutes at this temperature the polymer had set solid. It was re-melted at a temperature of 320° C. and heating continued. The final product had a melting point of 280–285° C.

*Example 4.—Production of co-polymer with terephthalate and glycol*

18 parts of the ester obtained according to Example 2, 4 parts of dimethyl terephthalate and 1.9 parts of ethylene glycol were mixed with a small quantity of magnesium ribbon and of sodium methylate in methanol and the mixture was refluxed under a water-cooled condenser for 45 minutes at 120° C. The condenser water was then run out and the temperature gradually raised to 130° C. After 30 minutes the condenser was removed and heating continued at the same temperature for 30 minutes and the temperature then raised to 260° C. during 45 minutes. This temperature was maintained for another hour and then raised to 280° C. for 4 hours. At this stage the product melted at 232–236° C. and gave brittle fibres. Heating was continued for a further 5 hours at 280° C. under an absolute pressure of 1 mm. of mercury. The melting point of the product remained the same and the polymer at the end of this further period of heating gave fibres from the melt having good cold-drawing properties.

*Example 5.—Production of co-polymer with hydroxyethoxy-benzoic acid*

2 parts of the ester obtained according to Example 2 were mixed with 1 part of methyl-4-(β-hydroxyethoxy)-benzoate and a small quantity of magnesium ribbon and of sodium methylate dissolved in methanol, and the mixture was heated slowly without a condenser while the solvent distilled off. On continued heating after 2 hours the temperature had reached 260° C. and the melt became more viscous. After a further 20 minutes the product solidified to a creamy solid. The temperature was then raised to 280° C. and thence to 290° C. After 4 hours of this further heating the pressure was reduced to an absolute pressure of 1 mm. of mercury and these conditions maintained for 75 minutes. The product was a hard crystalline polymer having a melting point of 255–260° C. and it gave fibres which could be cold drawn.

Having described my invention, what I desire to secure by Letters Patent is:

1. 4-(β-hydroxyethoxy)-3-chlorbenzoic acid.
2. An ester of 4-(β-hydroxyethoxy)-3-chlorbenzoic acid with a compound containing an OH group.
3. An ester of 4-(β-hydroxyethoxy)-3-chlorbenzoic acid with a compound containing a single OH group volatile at 300° C.
4. A substance selected from the group consisting of the methyl, ethyl, formyl and acetyl esters of 4-(β-hydroxyethoxy)-3-chlorbenzoic acid.
5. Poly-4-(β-hydroxyethoxy)-3-chlor-benzoic acid.

6. A polymer whose structural units consist predominantly of

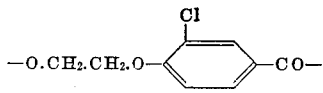

7. A polyester of 4-(β-hydroxyethoxy)-3-chlorbenzoic acid.

8. A polyester of a major proportion of 4-(β-hydroxyethoxy)-3-chlorbenzoic acid and a minor proportion of another hydroxy carboxylic acid.

9. A polyester of a glycol, a dicarboxylic acid and a major proportion of 4-(β-hydroxyethoxy)-3-chlorbenzoic acid.

10. A polyester of 4-(β-hydroxyethoxy)-3-chlorbenzoic acid and another aromatic hydroxy carboxylic acid, said polyester having a melting point of at least 230° C.

11. A polyester as set forth in claim 10 in which said other hydroxyacid is 4-(β-hydroxyethoxybenzoic acid, said polyester having a melting point of 240 to 270° C.

12. A polyester of 4-(β-hydroxyethoxy)-3-chlorbenzoic acid and a glycol and an aromatic dicarboxylic acid, said polyester having a melting point of at least 230° C.

13. A polyester as set forth in claim 12 in which said glycol is a polymethylene glycol and said aromatic dicarboxylic acid is terephthalic acid.

14. A polyester as set forth in claim 13 in which said glycol is ethylene glycol, said polyester having a melting point of 240 to 270° C.

15. Process for the production of polymers which comprises heating a polyester-forming composition comprising predominantly a substance selected from the group consisting of 4-(β-hydroxyethoxy)-3-chlorbenzoic acid and esters thereof with monohydroxy compounds volatile at 300° C. to produce a polyester.

References Cited in the file of this patent

UNITED STATES PATENTS

| Number | Name | Date |
|---|---|---|
| 2,471,023 | Cook et al. | May 24, 1949 |